United States Patent
Chae

(10) Patent No.: US 8,418,464 B2
(45) Date of Patent: Apr. 16, 2013

(54) LINEAR SOLAR HEAT GENERATING SYSTEM

(76) Inventor: Soo-Joh Chae, Seoul (KR)

( * ) Notice: Subject to any disclaimer, the term of this patent is extended or adjusted under 35 U.S.C. 154(b) by 124 days.

(21) Appl. No.: 13/036,381

(22) Filed: Feb. 28, 2011

(65) Prior Publication Data

US 2011/0209476 A1 Sep. 1, 2011

Related U.S. Application Data

(63) Continuation of application No. PCT/KR2009/004741, filed on Aug. 25, 2009.

(30) Foreign Application Priority Data

Aug. 27, 2008 (KR) .................. 10-2008-0083800

(51) Int. Cl.
| | | |
|---|---|---|
| F03G 6/00 | (2006.01) | |
| F03G 7/00 | (2006.01) | |
| F01B 29/08 | (2006.01) | |
| F01B 29/10 | (2006.01) | |
| F01K 25/00 | (2006.01) | |
| F02G 1/04 | (2006.01) | |
| F24J 2/38 | (2006.01) | |
| F24J 2/18 | (2006.01) | |

(52) U.S. Cl.
USPC .......... 60/641.15; 60/641.14; 60/516; 60/520; 126/600; 126/685

(58) Field of Classification Search ........... 60/516–526, 60/641.8–641.15; 126/683–703
See application file for complete search history.

(56) References Cited

U.S. PATENT DOCUMENTS

| 4,090,498 | A | * | 5/1978 | Benson | ................ | 126/574 |
|---|---|---|---|---|---|---|
| 4,173,123 | A | * | 11/1979 | Gurtler | ............ | 60/641.13 |
| 4,229,660 | A | * | 10/1980 | Adler | ................ | 290/2 |
| 4,353,212 | A | * | 10/1982 | Adler | ................ | 60/622 |
| 4,399,368 | A | * | 8/1983 | Bucknam | .......... | 290/1 R |
| 4,452,047 | A | * | 6/1984 | Hunt et al. | .......... | 60/641.15 |
| 4,821,516 | A | * | 4/1989 | Isshiki | ............ | 60/517 |
| 6,843,057 | B2 | * | 1/2005 | Yamamoto | ............ | 60/520 |

FOREIGN PATENT DOCUMENTS

| JP | 9280664 | 10/1997 |
|---|---|---|
| KR | 20050118096 | 12/2005 |
| KR | 20080020047 | 3/2008 |
| KR | 100818197 | 4/2008 |

OTHER PUBLICATIONS

International Search Report dated Apr. 26, 2010 received in corresponding Application No. PCT/KR2009/004741.

* cited by examiner

Primary Examiner — Kenneth Bomberg
Assistant Examiner — Christopher Jetton
(74) Attorney, Agent, or Firm — Grossman Tucker Perreault & Pfleger, PLLC

(57) ABSTRACT

An eco-friendly linear solar heat generating system may employ a linear engine with a simple structure using solar heat is employed in place of a conventional Stirling engine with a complicated structure. Magnets and a coil are arranged in a piston and a cylinder, respectively, to thereby generate power in a highly efficient matter, improve installation stability, and enable easy maintenance and repair.

11 Claims, 7 Drawing Sheets

LINEAR SOLAR HEAT GENERATING SYSTEM

CROSS-REFERENCE TO RELATED APPLICATION

The present application is a continuation of prior PCT Application No. PCT/KR2009/004741 filed on Aug. 25, 2009, which is fully incorporated herein by reference.

TECHNICAL FIELD

The present invention relates to an eco-friendly linear solar heat generating system wherein a linear engine with a simple structure using solar heat is employed in place of a conventional Stirling engine with a complicated structure, and magnets and a coil are arranged in a piston and a cylinder, respectively, to thereby generate power in a highly efficient matter, improve installation stability, and enable easy maintenance and repair.

BACKGROUND ART

Generally, electricity is produced by use of solar energy through a method of directly converting sunlight to electric energy and through a method of driving a generator as a heat engine using solar heat.

A solar power generator, which converts the sunlight directly to electricity, uses solar cells and is widely used because it is durable and easy to make the generation system semi-automatic or automatic.

However, this solar cell uses only a portion of sunlight in the range of visible and infrared rays, and low energy photon in long wavelength infrared ray cannot be used for electricity generation but increase the temperature of the solar cells, thereby lowering the efficiency of power generation. Moreover, the solar cells are expensive and have a significantly lower efficiency of power generation than the heat engines.

Meanwhile, a solar power generator driven by concentrated solar heat produces electricity using a heat engine such as turbine or Stirling engine that is driven by highly dense heat source, and has a higher theoretical efficiency of heat engine than the solar cells. Particularly, in order to drive the power generator using the solar heat, steam has to be generated to drive the turbine or the hot section of the Stirling engine has to be heated. The Stirling engine is a kind of external combustion engine that seals up operating gas, such as hydrogen or helium, in a space made with a cylinder and a piston and heats up and cools down this operating gas from the outside to reciprocate the piston to obtain mechanical energy. However, to drive the generator by operating such turbine or Stirling engine, the overall equipment becomes bigger and complicated, making it expensive to install and difficult to maintain and repair.

DESCRIPTION OF KEY ELEMENTS

Figure 1:
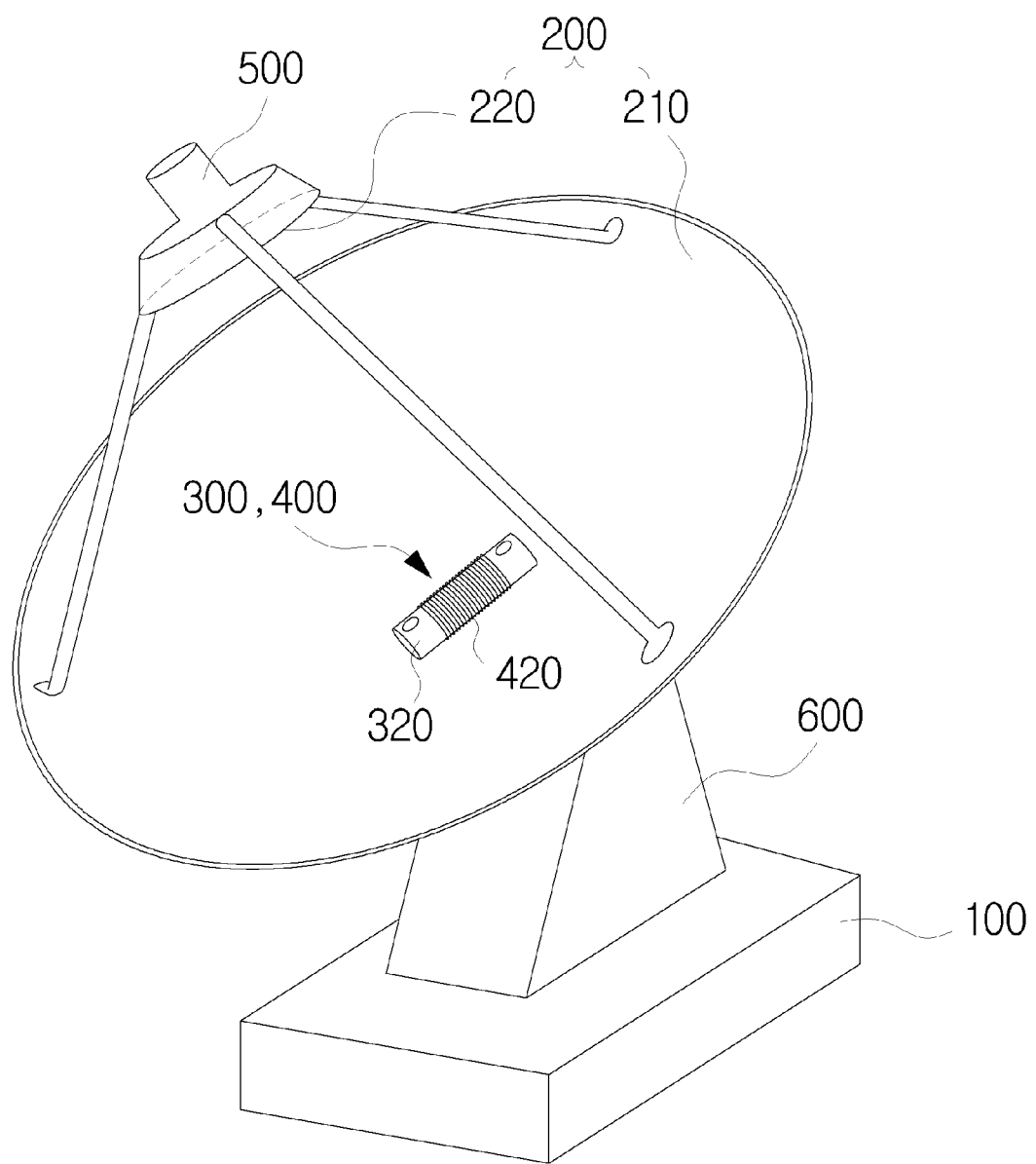
FIG. 1 illustrates an embodiment of a linear solar heat generating system in accordance with the present invention.

100: frame
200: solar concentrator
210: primary mirror
220: secondary mirror
300: heat engine
310: piston
320: cylinder
330: window
340: black body
350: cooling unit
351: cooling fin
352: cooling fan
400: power-generating unit
410: magnet
420: coil
500: tilting unit
510: tilting axle
520: tilting motor
600: tracking unit

DETAILED DESCRIPTION

Technical Problem

Contrived to solve the above problems, the present invention provides an eco-friendly linear solar heat generating system wherein a linear engine with a simple structure using solar heat is employed in place of a conventional Stirling engine with a complicated structure, and magnets and a coil are arranged in a piston and a cylinder, respectively, to thereby generate power in a highly efficient matter, improve installation stability, and enable easy maintenance and repair.

Other objects, peculiar features and new features of the present invention will become more apparent through the accompanying drawings and the detailed description and embodiments.

Technical Solution

Contrived to achieve the above objects, the linear solar heat generating system in accordance with the present invention is constituted by including: a frame; a solar concentrator installed in the frame and configured to concentrate the sunlight; a heat engine constituted with a cylinder and high-pressure gas, the cylinder divided into a front space and a rear space by a piston, the high-pressure gas housed in the front space and the rear space of the cylinder, the piston being linearly reciprocated by thermally expanding or contracting the high-pressure gas housed in the front space and the rear space of the cylinder by alternately transferring the concentrated sunlight from the solar concentrator to the high-pressure gas; and a power-generating unit constituted with a plurality of magnets and a coil, the plurality of magnets installed lengthwise along an outer circumference of the piston, the coil wound lengthwise along an outer circumference of the cylinder, the magnets oscillating according to a linear reciprocating motion of the piston to generate electricity from the coil.

The solar concentrator can include: a primary mirror installed on the frame; and a secondary mirror configured to re-reflect the sunlight reflected by the primary mirror and concentrate the sunlight to one point. The primary mirror and the secondary mirror can be a Cassegrain type in which a confocal point is a virtual focal point.

The solar concentrator can include: a primary mirror installed on the frame; and a secondary mirror configured to re-reflect the sunlight reflected by the primary mirror and concentrate the sunlight to one point. The primary mirror and the secondary mirror can be a Gregorian type in which a confocal point is a real focal point.

The linear solar heat generating system can also include a tilting unit configured to tilt the secondary mirror so that the re-reflected and concentrated sunlight by the secondary mirror of the solar concentrator is alternately irradiated toward the high-pressure gas housed in the front space and the rear space of the cylinder of the heat engine.

The tilting unit can include: a tilting axle configured to rotatably support the secondary mirror; and a tilting motor configured to rotate the tilting axle forward and reverse.

The heat engine can also include a light-permeating, window installed in the front space and the rear space of the cylinder so that the sunlight concentrated by the solar concentrator is irradiated toward the high-pressure gas housed in the front space and the rear space of the cylinder.

The heat engine can also include a black body installed inside the front space and the rear space of the cylinder and configured to absorb the sunlight irradiated through the window and makes a heat transfer toward the high-pressure gas housed in the front space and the rear space of the cylinder.

The black body can be formed by spraying and coating a corpuscular form of black carbon.

The heat engine can also include a cooling unit installed on each outer circumference of the front space and the rear space of the cylinder.

The cooling unit can include: a plurality of cooling fins formed on each outer circumference of the front space and the rear space of the cylinder; and a cooling fan configured to cool by supplying air to the cooling fins.

The cooling unit can include: a cooling tube would on an each outer circumference of the front space and the rear space of the cylinder; and a cooling pump configured to supply coolant to the cooling tube.

The linear solar heat generating system can also include a tracking unit installed on the frame and configured to rotate the solar concentrator so that the quantity of incident sunlight is maximized by tracking the motion of the sun that moves from the east to the west from the sunrise to the sunset.

Advantageous Effects

The linear solar heat generating system in accordance with the present invention allows for an easy installation, maintenance and repair, highly efficient power generation and eco-friendly power generation through the simple structure of integrating the linear power generator with the heat engine that linearly reciprocates the piston by thermal expansion and contraction of the high-pressure gas by alternately transferring the concentrated sunlight form the solar concentrator to the front and rear spaces of the cylinder.

Moreover, by designing the solar concentrator as a Cassegrain type or a Gregorian type constituted with the primary mirror and the secondary mirror, the sunlight can be concentrated in a higher density, thereby enhancing the efficiency of thermal expansion of the high-pressure gas, and the cooling unit can enhance the cooling efficiency of the high-pressure gas inside the cylinder, thereby increasing the overall thermal efficiency and achieving high-efficient power generation.

Best Mode

Hereinafter, some embodiments of a linear solar heat generating system in accordance with the present invention will be described with reference to the accompanying drawings.

Figure 2:
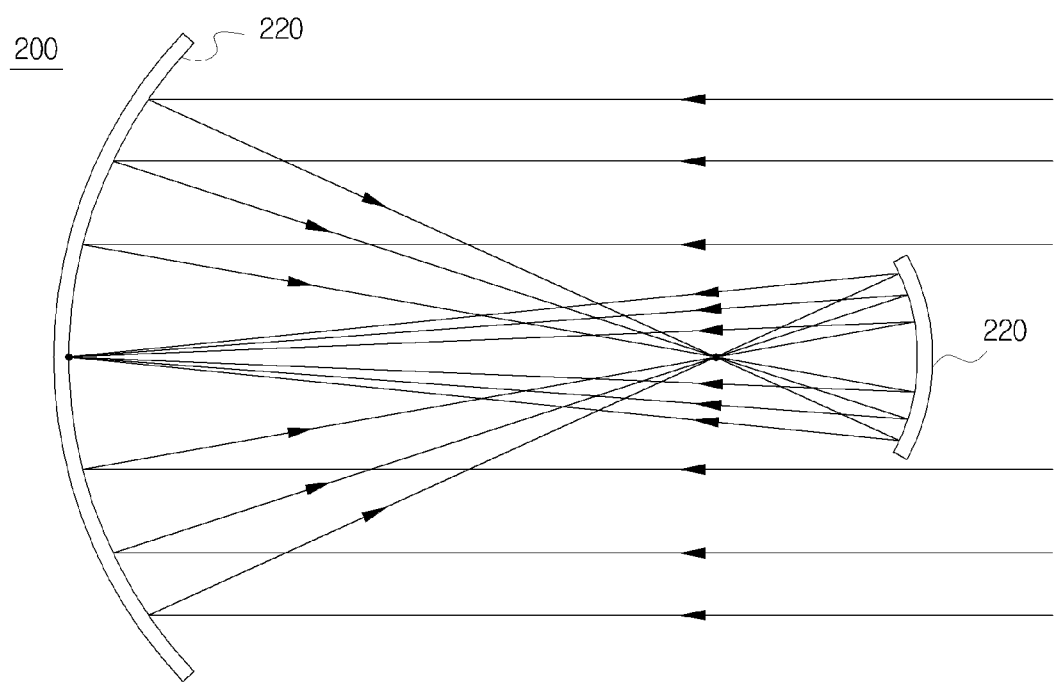
FIG. 2 is a side view of a main part of a first embodiment of a solar concentrator in a linear solar heat generating system in accordance with the present invention.
Figure 3:
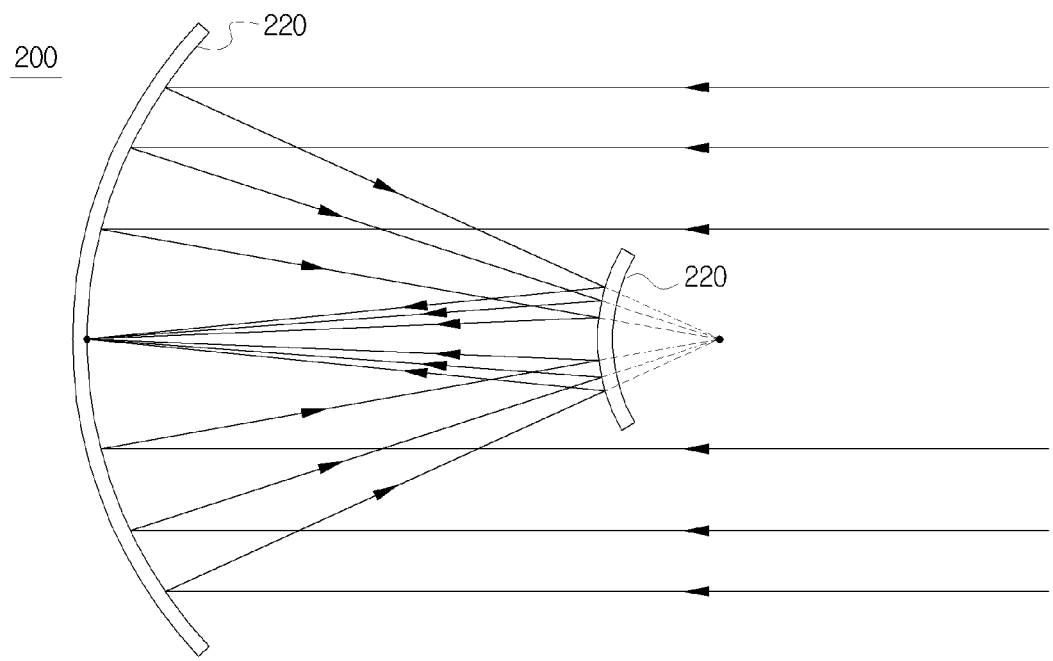
FIG. 3 is a side view of a main part of a second embodiment of a solar concentrator in a linear solar heat generating system in accordance with the present invention.
Figure 4:
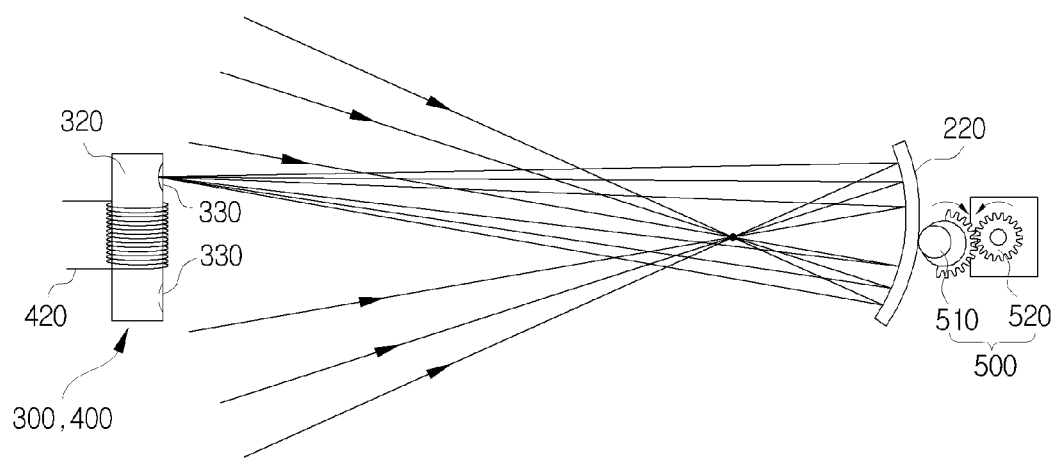
FIGS. 4 and 5 are side views of a main part illustrating the operation of a tilting unit in a linear solar heat generating system in accordance with the present invention.
Figure 5:
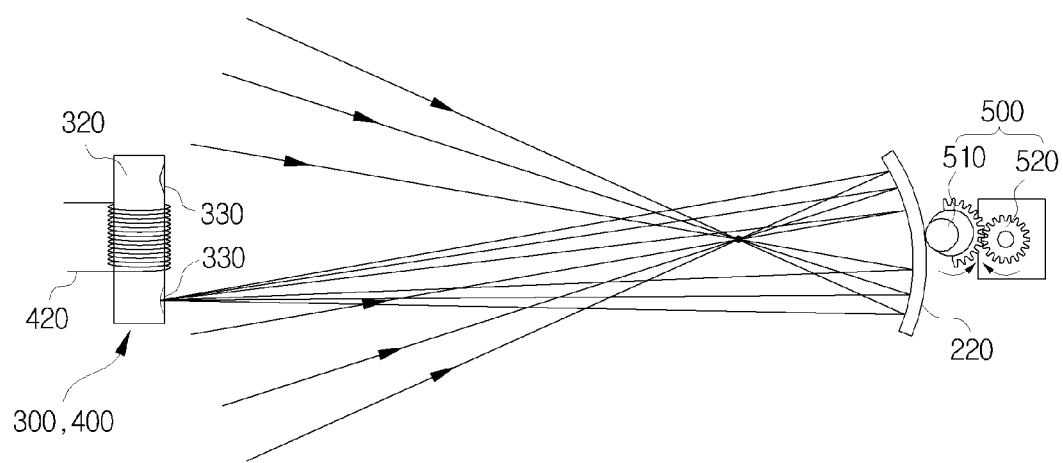
Figure 6:
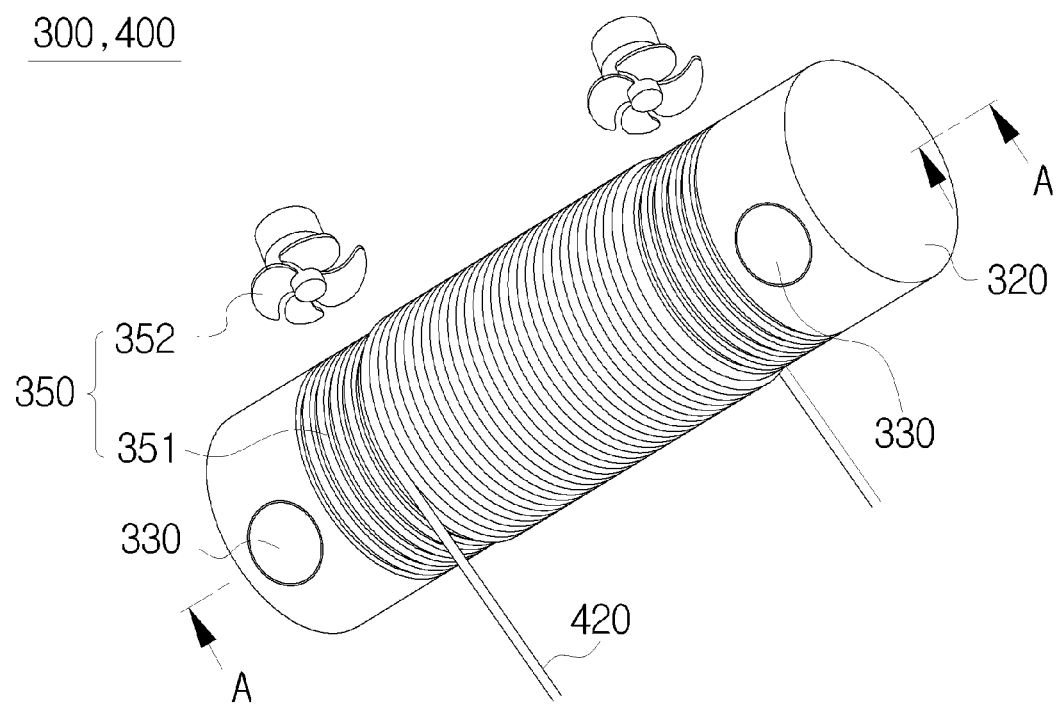
FIG. 6 is a perspective view illustrating an embodiment of a heat engine and a generating unit in a linear solar heat generating system in accordance with the present invention.
Figure 7:
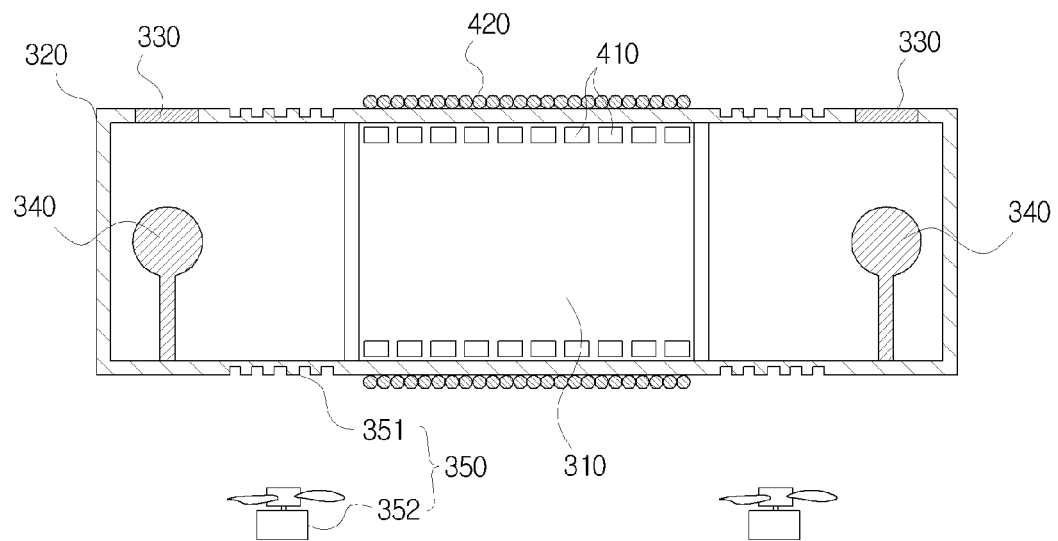
FIG. 7 is a cross-sectional view of the embodiment shown in FIG. 6 along the A-A line.

FIG. 1 illustrates an embodiment of a linear solar heat generating system in accordance with the present invention. FIG. 2 is a side view of a main part of a first embodiment of a solar concentrator in a linear solar heat generating system in accordance with the present invention. FIG. 3 is a side view of a main part of a second embodiment of a solar concentrator in a linear solar heat generating system in accordance with the present invention. FIGS. 4 and 5 are side views of a main part illustrating the operation of a tilting unit in a linear solar heat generating system in accordance with the present invention. FIG. 6 is a perspective view illustrating an embodiment of a heat engine and a generating unit in a linear solar heat generating system in accordance with the present invention. FIG. 7 is a cross-sectional view of the embodiment shown in FIG. 6 along the A-A line.

As shown in FIGS. 1 to 7, the linear solar heat generating system in accordance with the present invention is constituted by including a frame 100, a solar concentrator 200, a heat engine 300, a power-generating unit 400, a tilting unit 500 and a tracking unit 600. In addition, the solar concentrator 200 can include a primary mirror 210 and a secondary mirror 220, and the heat engine 300 can include a piston 310, a cylinder 320, a window 330, a black body 340 and a cooling unit 350. Particularly, the cooling unit 350 can be constituted with a cooling fin 351 and a cooling fan 352 or with a cooling tube 353 and a cooling pump 354, and the tilting unit 500 can include a tilting axle 510 and a tilting motor 520.

As illustrated in FIG. 1, the frame 100 is a structure that supports individual components of the linear solar heat generating system of the present invention, and as long as the stability of the system can be secured, any shape or material can be used, but a hexahedral steel structure is generally used.

As illustrated in FIG. 1, the solar concentrator 200 is installed on the frame 100 and concentrates the sunlight. In order to drive a heat engine using the solar energy, high-density sunlight needs to be concentrated to a single point. The sunlight can be concentrated by a refractive concentrating method, by which a lens such as a magnifying lens is used to refract the sunlight and concentrate the sunlight to one point, and a reflective concentrating method, by which a curved mirror is used to reflect the sunlight and concentrate the sunlight to one point. Although a lens, such as the magnifying lens, or a mirror can be used or to concentrate the light in the solar concentrator 200, the more dense sunlight can be concentrated by the reflective concentrating method than by the refractive concentrating method.

With the reflective concentrating method, the sunlight can be concentrated in various ways based on the number and form of reflection, but in the present invention, 2 mirrors are used to concentrate the light, as illustrated in FIGS. 3 and 4.

As illustrated in FIGS. 3 and 4, the solar concentrator 200 is constituted by the primary mirror 210 and the secondary mirror 220. That is, the primary mirror 210 having a greater diameter reflects the incident light of the sun to irradiate the sunlight to the secondary mirror 220 having a smaller diameter, and the secondary mirror 220 re-reflects the sunlight reflected by the primary mirror 210 to concentrate the highly-dense sunlight to one point. Here, the primary mirror 210 has a parabolic curvature to reflect the incident sunlight toward a confocal point. The shape of the secondary mirror 220 differs based on the surface facing the primary mirror 210. If the surface of the secondary mirror 220 facing the primary mirror is convex, the shape of the secondary mirror 220 is hyperbolic, and if the surface is concave, the shape is elliptic. That is, as illustrated in FIG. 2, in case the surface of the secondary mirror 220 facing the primary mirror 210 is concave, the primary mirror 210 and the secondary mirror 220 are a Gregorian type, in which the confocal point is a real focal point, and in case the surface of the secondary mirror 220 facing the primary mirror 210 is convex, the primary mirror 210 and the secondary mirror 220 are a Cassegrain type, in which the confocal point is a virtual focal point. The primary mirror 210 and the secondary mirror 220 may be produced as a form in which a highly-reflective glass mirror is attached to a dish-type steel structure (not shown) or as a mirror form in which aluminum is coated on a durable film. The heat engine 300 is constituted by, as illustrated in FIGS. 4 to 7, the cylinder 320, whose front space and rear space are divided by the piston 310, and high-pressure gas housed in each of the front space and rear space of the cylinder 320. The high-pressure gas housed in each of the front space and rear space of the cylinder 320 alternately receives the concentrated sunlight from the solar concentrator 200 to thermally expand and contract and linearly reciprocate the piston 310. The heat engine 300 of the present invention is an external combustion engine that corresponds to a theoretical Stirling engine. That is, The high-pressure gas, such as hydrogen or helium, which is the operating gas, is sealed up in a space formed by the cylinder 320 and the piston 310, and this gas is heated and cooled by the sunlight from the outside to thermally expand and contract this gas and to move the piston 310 in order to obtain mechanical energy. In other words, when thermal energy is absorbed in the high-pressure gas housed in the front space and rear space of the cylinder 320, the molecules of the high-pressure gas gets excited to have an active molecular motion, and the speed of the molecules increases. The number of collisions that the molecules of the high-pressure gas make with the walls of the cylinder 320 increases proportionally with the molecular motion, and if the volume is fixed, the pressure inside the volume increases. This pressure pushes the piston 310 installed inside the cylinder 320 to cause the linear motion. The heat engine 300 according to the above principle has 4 cycles, which are heating, expanding, cooling and compressing.

More specifically, the heat source of the thermal energy of the sunlight concentrated by the solar concentrator 200 is transferred to and heats the high-pressure gas housed in the front space of the cylinder 320, and the high-pressure gas housed in the front space of the cylinder 320 is thermally expanded to push the piston 310 toward the read end of the cylinder 320. When the sunlight concentrated by the solar concentrator 200 is irradiated away from the front space of the cylinder 320 and to the rear space of the cylinder 320, the front space of the cylinder 320 becomes cooled and the high-pressure gas becomes contracted, and the rear space of the cylinder 320 has the same process as described above to push the piston 310 from the rear space to the front space of the cylinder 320. In other words, by alternately transferring the sunlight concentrated by the solar concentrator 200 to the front space and rear space of the cylinder 320, the piston 310 gets to have a linear reciprocating motion between the front space and rear space of the cylinder 320. In the heat engine 300 of the present invention, the apparatus is simple because only one piston 310 is linearly reciprocating in one cylinder 320, and electric power is generated by the linear power-generating unit 400, which will be described in detail later, by mechanical energy generated by the reciprocating movement of the piston 310.

The tilting unit 500 is installed as illustrated in FIGS. 4 and 5 in order to have the sunlight concentrated from the solar concentrator 200 alternately transferred to the high-pressure gas housed in the front and rear spaces of the cylinder 320 of the heat engine 300. The tilting unit 500 tilts the secondary mirror 220 so that the sunlight concentrated by being re-reflected by the secondary mirror 220 of the solar concentrator 200 can be irradiated to the high-pressure gas housed in the front and rear spaces of the cylinder 320 of the heat engine 300. Various forms of tilting mechanism, such as a slide-link structure by a linear motor or a cam-shaft structure, can be considered for tilting an element at a certain angle, but since such tilting mechanism can be embodied with conventional technology, the description thereof will be omitted herefrom.

However, as illustrated in FIGS. 4 and 5, the simplest form of tilting mechanism, which is structured by the tilting motor 520 that rotates the tilting axle 510 forward and reverse, can be presented. In other words, the tilting axle 510 can be installed with the secondary mirror 220 so as to rotatably support the secondary mirror 220 of the solar concentrator 200, and the tilting motor 520 can be installed so as to rotate the tilting axle 510 forward and reverse. In this case, power transfer means, such as a gear, chain or belt, will be needed to transfer the rotational power of the tilting motor 520 to the tilting axle 510, and the tilting motor 520 itself can have a brake (not shown) or introduce a brake during the transfer of the power so as to prevent excessive rotation of the tilting motor 520. The above tilting unit 500 is mounted in a cast that supports the secondary mirror 220 and is driven by a control signal of a controller (not shown).

In order to cause thermal expansion by easily transferring the sunlight concentrated from the solar concentrator 200 to the high-pressure gas housed in the front and rear spaces of the cylinder 320 of the heat engine 300, the window 330 and the black body 340 are installed, as illustrated in FIGS. 6 to 7. The window 330 is installed in the front and rear spaces of the cylinder 320 so that the sunlight concentrated from the solar concentrator 200 is irradiated toward the high-pressure gas housed in the front and rear spaces of the cylinder 320. The black body 340 is installed inside the front and rear spaces of the cylinder 320, and makes a heat transfer toward the high-pressure gas housed in the front and rear spaces of the cylinder 320 by absorbing the sunlight irradiated through the window 330. Accordingly, the sunlight concentrated from the solar concentrator 200 is irradiated to the inside of the cylinder 320 through the window 330, and the sunlight is absorbed to the black body 340 installed inside the cylinder 320, causing the black body 340 to heat up. Then, the heat is transferred from the heated black body 340 to the high-pressure gas housed in the front and rear spaces of the cylinder 320, causing the high-pressure gas to thermally expand. The corpuscular form of carbon black can be sprayed and coated to form the black body 340, thereby enhancing the absorption of the sunlight and increasing the heat transfer efficiency to the high-pressure gas. The sunlight concentrated from the solar concentrator 200 is irradiated to one point, and the concentrated sunlight is irradiated to the front space or the rear space of the cylinder 320 selectively by the operation of the tilting unit 500. In effect, the piston 310 slidably installed inside the cylinder 320 makes a linear reciprocating motion by the thermal expansion and contraction of the high-pressure gas housed in the front and rear spaces of the cylinder 320.

When the concentrated sunlight is alternately irradiated to the front space and rear space of the cylinder 320 of the heat engine 300, that is, when the sunlight is irradiated from the front space to the rear space or from the rear space to the front space of the cylinder 320, the sunlight irradiation is stopped on one of the front and rear spaces of the cylinder 320, which becomes cooled while waiting irradiation and becomes contracted. In the meantime, the other side of the front and rear spaces of the cylinder 320 becomes heated and thermally expanded, and the thermal efficiency of the heat engine 300 can be increased by enhancing the cooling efficiency of the side of the cylinder 320 that is cooled and contracted. For this, as illustrated in FIGS. 6 and 7, the cooling unit 350 is installed near the outer circumference of the front and rear spaces of the cylinder 320. In order to increase the contact areas so as to rapidly achieve the cooling in the waiting condition, a plurality of cooling fins 351 can be formed on the outer circumference of the front and rear spaces of the cylinder 320, as illustrated in FIGS. 6 and 7.

Here, the cooling fans 352 can be additionally installed to supply air to the cooling fins 351. In other words, the above cooling unit 350 is an air-cooled type, but it is also possible to embody the cooling unit 350 as a water-cooled type. For instance, although not illustrated in the drawings, the cooling unit 350 can be configured with a cooling tube and a cooling pump, in which the cooling tube can be wound on the outer circumference of the front and rear spaces of the cylinder 320 and the cooling pump supplies coolant to the cooling tube, to cool the front and rear spaces of the cylinder 320.

As illustrated in FIGS. 6 and 7, the power-generating unit 400 is constituted by a plurality of magnets 410, which are installed lengthwise on the outer circumference of the piston 310, and a coil 420, which is wound lengthwise on the outer circumference of the cylinder 320. In other words, the power-generating unit 400 generates electricity from the coil 420 as the magnets 410 oscillate according to the linear reciprocating motion of the piston 310. That is, the power-generating unit 400 of the present invention a linear power generator that is integrated in the piston 310 and the cylinder 320 of the heat engine 300 to convert mechanical energy to electric energy.

The electricity generated from the coil 420 by the oscillation of the magnets 410 is an induced electromotive force. That is, induction, in which the motion of electrons occurs when a magnetic field is generated by the magnets 410 around the coil (which is a conductor), occurs, as the magnetic field is generated when electric current flows. The induced electromotive force generated from the coil 420 is connected to a first side of a transformer configured as an LC resonance circuit, and AC electricity can be generated from a second side of the transformer. The linear power generator such as described above can be embodied with the conventional technology, and thus the detailed description thereof will be omitted herefrom.

The tracking unit 600 is installed on the frame 100, as illustrated in FIG. 1, and tracks the movement of the sun from the east to the west between the sunrise and sunset to rotate the solar concentrator 200 so as to maximize the quantity of light of the incident sunlight. The tracking unit 600 refers to a common sunlight tracking device, which tracks the position of the sun so that a maximum amount of direct sunlight is always incident at the solar concentrator 200 so as to maximize the efficiency of power generation of a power generation system using the solar energy. The power generation system using the solar energy can be a fixed type or a tracking type, and it is known that the tracking type has a better efficiency of power generation than the fixed type by about 20% to 60%. The fixed type is installed at a fixed position with the displacement of 30 degrees between the east and the west from the direct south azimuth. The tracking type can be a single axis type or a double axes type. The single axis type is rotated from the east to the west according to the change in the azimuth of the sunlight, and the double axes type is rotated from the east to the west and from the south to the north according to the change in the azimuth and height of the sunlight. The tracking type described above can be designed to be able to track the position of the sun, within a certain range of error, based on the rotation and revolution of the earth. The double axes type is naturally better in the power generating efficiency than the single axis type by 10% to 40%, and it is preferable that the double axes type is used to maximize the power generating efficiency in order to concentrate the highly dense sunlight in the present invention. The double axes tracking type can be again classified into a program type and a sensor type. The sensor type, which tracks the sun according to the maximum quantity of the light sensed by an optical sensor, is sensitive to the change in the surrounding conditions and weather and requires regular cleaning, maintenance and repair. On the contrary, the program type, which is operated to receive an optimal amount of solar radiation by automatically rotating in conjunction with the east-west position and height of the sun through an accurate tracking of the position of the sun by computing the daily weather conditions and the times of sunrise and sunset, costs less to maintain and is capable of tracking the sun even when the clarity is low due to the surrounding environment or the change in weather. Accordingly, the tracking unit 600 of the present invention can enhance the efficiency of power generation by rotating the solar concentrator 200 through the above sunlight tracking method and maximizing the quantity of the sunlight to be concentrated.

The embodiment of the present invention described above and illustrated in the drawings shall not be understood to restrict the technical ideas of the present invention. The scope of protection of the present invention shall be defined by the appended claims only, and it shall be appreciated that various types of improvements and modifications of the technical ideas of the present invention are possible by anyone of ordinary skill in the art to which the present invention pertains. Therefore, such improvements and modifications shall belong to the scope of protection of the present invention as long as they are obvious to those who are skilled in the art to which the present invention pertains.

What is claimed is:

1. A linear solar heat generating system, comprising:
   a frame;
   a solar concentrator installed in the frame and configured to concentrate the sunlight, the solar concentrator comprising a primary mirror installed on the frame and a secondary minor configured to re-reflect the sunlight reflected by the primary mirror and concentrate the sunlight to one point;
   a heat engine constituted with a cylinder, a piston, and a high-pressure gas, the cylinder divided into a front space and a rear space by the piston, the high-pressure gas housed in the front space and the rear space of the cylinder, the piston being linearly reciprocated by thermally expanding or contracting the high-pressure gas housed in the front space and the rear space of the cylinder by alternately transferring the concentrated sunlight from the solar concentrator to the high-pressure gas;
   a power-generating unit constituted with a plurality of magnets and a coil, the plurality of magnets installed lengthwise along an outer circumference of the piston, the coil wound lengthwise along an outer circumference of the cylinder, the magnets oscillating according to a linear reciprocating motion of the piston to generate electricity from the coil; and a tilting unit configured to tilt the secondary mirror so that the re-reflected and concentrated sunlight by the secondary mirror of the solar concentrator is alternately irradiated toward the high-pressure gas housed in the front space and the rear space of the cylinder of the heat engine.

2. The linear solar heat generating system of claim 1, wherein the primary mirror and the secondary minor are a Cassegrain type in which a confocal point is a virtual focal point.

3. The linear solar heat generating system of claim 1, wherein the primary mirror and the secondary minor are a Gregorian type in which a confocal point is a real focal point.

4. The linear solar heat generating system of claim 1, further comprising a tracking unit installed on the frame and configured to rotate the solar concentrator so that the quantity of incident sunlight is maximized by tracking the motion of the sun that moves from the east to the west from the sunrise to the sunset.

5. The linear solar heat generating system of claim 1, wherein the tilting unit comprises:
a tilting axle configured to rotatably support the secondary minor; and
a tilting motor configured to rotate the tilting axle forward and reverse.

6. A linear solar heat generating system, comprising:
a frame:
a solar concentrator installed in the frame and configured to concentrate the sunlight;
a heat engine constituted with cylinder, a piston, and a high-pressure gas, the cylinder divided into a front space and a rear space by the piston, the high-pressure gas housed in the front space and the rear space of the cylinder, the piston being linearly reciprocated by thermally expanding or contracting the high-pressure gas housed in the front space and the rear space of the cylinder by alternately transferring the concentrated sunlight from the solar concentrator to the high-pressure gas;
a power-generating unit constituted with a plurality of magnets and a coil, the plurality of magnets installed lengthwise along an outer circumference of the piston, the coil wound lengthwise along an outer circumference of the cylinder, the magnets oscillating according to a linear reciprocating motion of the piston to generate electricity from the coil; and a light-permeating window installed in the front space and the rear space of the cylinder so that the sunlight concentrated by the solar concentrator is irradiated toward the high-pressure gas housed in the front space and the rear space of the cylinder.

7. The linear solar heat generating system of claim 6, wherein the heat engine further comprises a black body installed inside the front space and the rear space of the cylinder and configured to absorb the sunlight irradiated through the window and makes a heat transfer toward the high-pressure gas housed in the front space and the rear space of the cylinder.

8. The linear solar heat generating system of claim 7, wherein the black body is formed by spraying and coating a corpuscular form of black carbon.

9. A linear solar heat generating system, comprising:
a frame:
a solar concentrator installed in the frame and configured to concentrate the sunlight;
a heat engine constituted with a cylinder, a piston, and a high-pressure gas, the cylinder divided into a front space and a rear space by the piston, the high-pressure gas housed in the front space and the rear space of the cylinder, the piston being linearly reciprocated by thermally expanding or contracting the high-pressure gas housed in the front space and the rear space of the cylinder by alternately transferring the concentrated sunlight from the solar concentrator to the high-pressure gas;
a power-generating unit constituted with a plurality of magnets and a coil, the plurality of magnets installed lengthwise along an outer circumference of the piston, the coil wound lengthwise along an outer circumference of the cylinder, the magnets oscillating according to a linear reciprocating motion of the piston to generate electricity from the coil; and
a cooling unit installed on each outer circumference of the front space and the rear space of the cylinder.

10. The linear solar heat generating system of claim 9, wherein the cooling unit comprises:
a plurality of cooling fins formed on each outer circumference of the front space and the rear space of the cylinder; and
a cooling fan configured to cool by supplying air to the cooling fins.

11. The linear solar heat generating system of claim 9, wherein the cooling unit comprises:
a cooling tube on an each outer circumference of the front space and the rear space of the cylinder; and
a cooling pump configured to supply coolant to the cooling tube.

* * * * *